(12) United States Patent
McMahon et al.

(10) Patent No.: US 8,090,481 B2
(45) Date of Patent: Jan. 3, 2012

(54) MANUAL HUMAN INTERFACES TO ELECTRONICS

(75) Inventors: Roy P. McMahon, Indianapolis, IN (US); Charles K. Rogers, Cumberland, IN (US); Basel Y. Mahmoud, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 988 days.

(21) Appl. No.: 12/034,520

(22) Filed: Feb. 20, 2008

(65) Prior Publication Data

US 2009/0012659 A1 Jan. 8, 2009

Related U.S. Application Data

(60) Provisional application No. 60/890,739, filed on Feb. 20, 2007.

(51) Int. Cl.
*G01C 23/00* (2006.01)
(52) U.S. Cl. ............................................. 701/3; 244/336
(58) Field of Classification Search ....... 701/3; 244/336
See application file for complete search history.

(56) References Cited

U.S. PATENT DOCUMENTS

| 4,926,172 | A |   | 5/1990  | Gorsek |   |
|---|---|---|---|---|---|
| 4,961,548 | A |   | 10/1990 | Adams et al. |   |
| 5,225,831 | A |   | 7/1993  | Osborn |   |
| 5,389,959 | A | * | 2/1995  | Haas | 347/187 |
| 5,472,156 | A |   | 12/1995 | Bivens, III et al. |   |
| 2007/0262206 | A1 | * | 11/2007 | Scott | 244/201 |
| 2008/0284257 | A1 | * | 11/2008 | Cope et al. | 310/15 |

OTHER PUBLICATIONS

European Patent Office, "*Communication Pursuant to Article 94(3) EPC*," Application No. 08 743 502.0-1254, mailed Jun. 1, 2010, 3 pages, mailed Feb. 28, 2011.
European Patent Office, "*Communication Pursuant to Article 94(3) EPC*," Application No. 08 743 502.0-1254, mailed Jun. 1, 2010, 4 pages, mailed Jun. 1, 2010.
*Notification of Transmittal of the International Search Report and the Written Opinion of the International Searching Authority, or the Declaration* for International Application No. PCT/US2008/054421; 13 pages, mailed Sep. 16, 2008.
European Patent Office, "*Communication Pursuant to Article 94(3) EPC*," Application No. 08 743 502.0-1254, mailed Nov. 30, 2009, 5 pages, mailed Nov. 30, 2009.

* cited by examiner

*Primary Examiner* — Mark Hellner
(74) *Attorney, Agent, or Firm* — Baker Botts L.L.P.

(57) ABSTRACT

In accordance with one embodiment of the present disclosure, a method for controlling an aircraft by a hands on throttle-and-stick (HOTAS) includes selectively connecting, by the HOTAS, two interfaces of a controller for the aircraft. The selective connection is made through one of a plurality of possible paths. Each path has an expected respective voltage drop within a predetermined range. The selected one of the possible paths connecting the two interfaces is determined by determining an actual voltage drop associated with the selected path. A control operation for the aircraft is effected by the controller based on the determined selected path. The method reduces the number of required electrical connections.

18 Claims, 2 Drawing Sheets

MANUAL HUMAN INTERFACES TO ELECTRONICS

CROSS REFERENCE TO RELATED APPLICATIONS

This application claims the benefit of priority under 35 U.S.C. §119(e) of U.S. Provisional Patent Application Ser. No. 60/890,739 entitled "Manual Human Interface to Electronics," which was filed on Feb. 20, 2007.

TECHNICAL FIELD

This disclosure relates in general to control systems, and more particularly to manual human interfaces to electronics.

BACKGROUND

Many electronic systems use manual human interface controls. For example, hands on throttle-and-stick (HOTAS) is a style of aircraft cockpit Human-Machine Interaction (HMI) that allows the pilot to access the cockpit functions and fly the aircraft. Similar HOTAS systems have also been adapted for game controllers used for flight simulators. The gaming industry includes many other types of manual controllers. The steering wheels of modern open-wheel racecars, like those used in Formula One and the Indy Racing League, sometimes include sophisticated manual controls. There is generally a tradeoff between the complexity of manual controls and cost.

SUMMARY

In accordance with one embodiment of the present disclosure, a method for controlling an aircraft by a hands on throttle-and-stick (HOTAS) includes selectively connecting, by the HOTAS, two interfaces of a controller for the aircraft. The selective connection is made through one of a plurality of possible paths. Each path has an expected respective voltage drop within a predetermined range. The selected one of the possible paths connecting the two interfaces is determined by determining an actual voltage drop associated with the selected path. A control operation for the aircraft is effected by the controller based on the determined selected path. The method reduces the number of required electrical connections.

Some embodiments of the disclosure implement additional control inputs, such as multi-position switches, on to stick grips and throttle handles without additional wire paths into and through control sticks and throttle quadrants. Some such embodiments may use existing connector interfaces to control boxes for backward compatibility.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1:
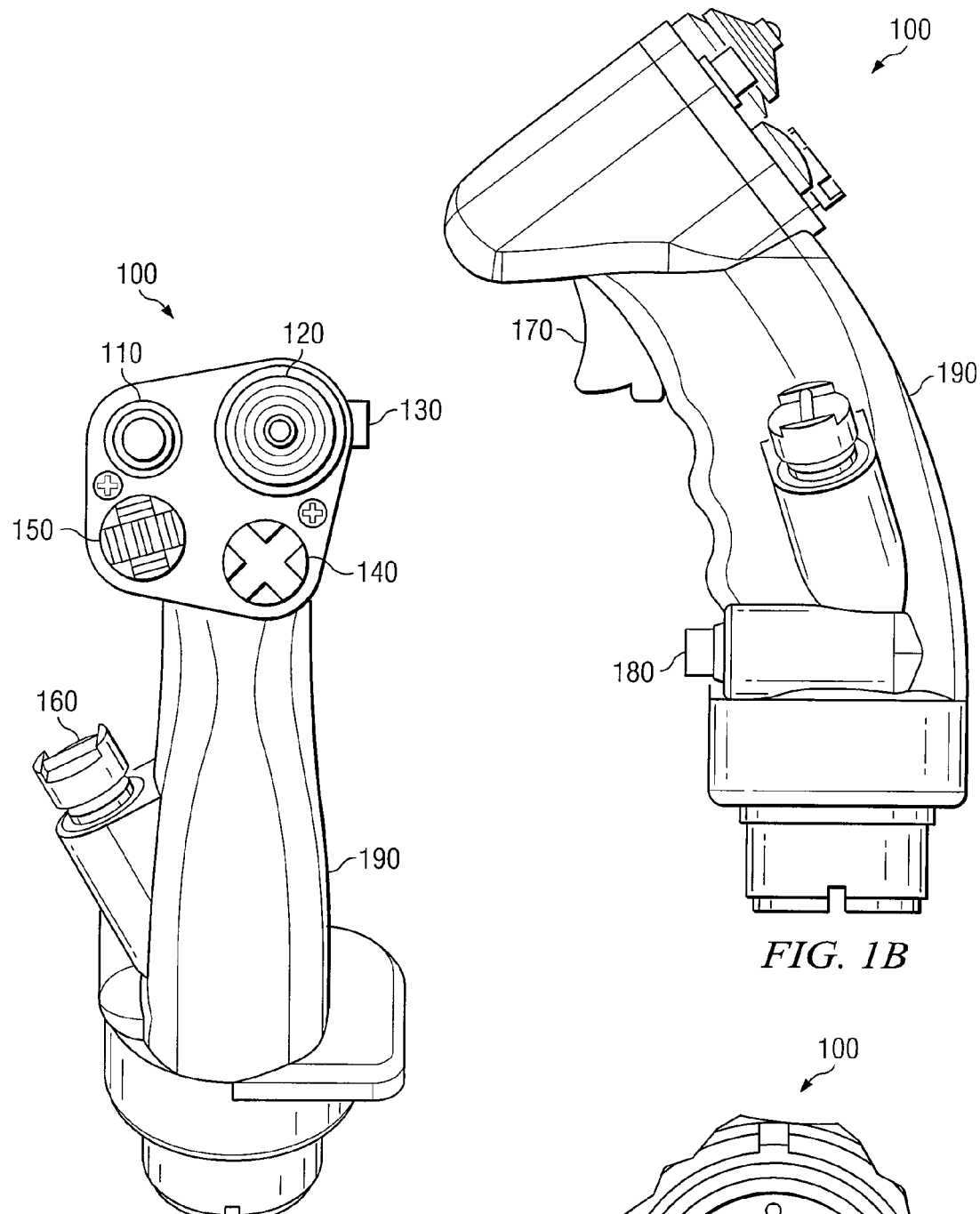
FIGS. 1A through 1C are perspective views of a Hands On Throttle And Stick (HOTAS) interface that forms a portion of a control system according to one embodiment.
Figure 2:
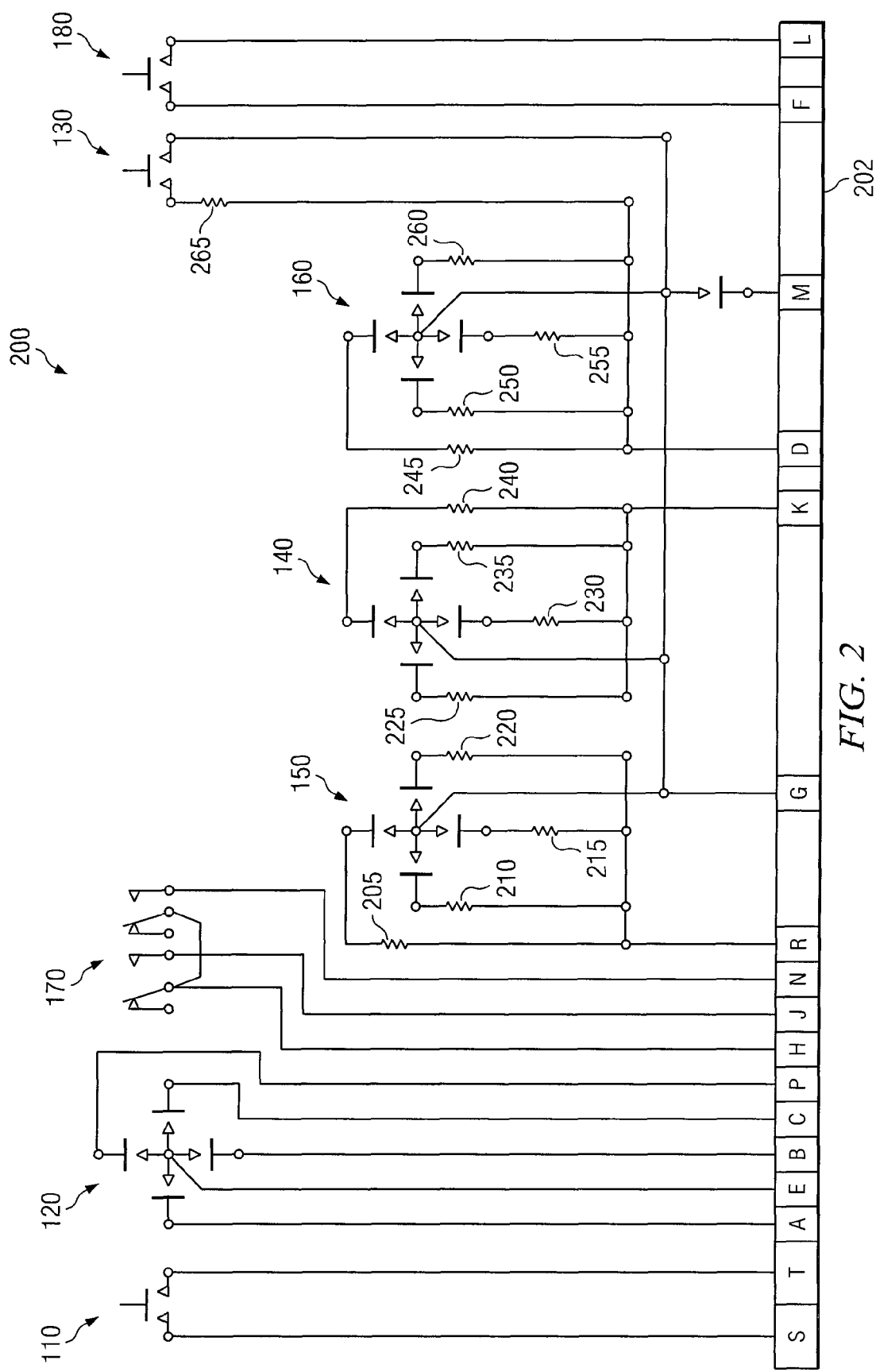
FIG. 2 is a schematic for an electrical circuit that forms a portion of the control system of FIGS. 1A through 1C according to one embodiment.

The example embodiments of the present disclosure are best understood by referring to FIGS. 1A through 2 of the drawings, like numerals being used for like and corresponding parts of the various drawings.

FIGS. 1A through 1C are perspective views of a Hands On Throttle And Stick (HOTAS) interface 100 that forms a portion of a control system according to one embodiment. The control system of the illustrated example generally includes two distinct parts communicatively coupled together: the HOTAS interface 100 that may be manipulated by a pilot, co-pilot, and/or crew member (collectively referred to herein as "pilot"), and the avionics equipment that receives and interprets the pilot manipulation (e.g., electronic circuitry illustrated in FIG. 2).

Interface 100 generally includes a plurality of control inputs 110-180 coupled to a control stick grip 160. In this example, each of the eight control inputs 110, 120, 130, 140, 150, 160, 170, and 180 has a corresponding function. For example, control input 120 may be used for aircraft trim, control input 150 may be used for target management, control input 170 may be used as a weapons trigger, and so forth. In addition, some control inputs may be manipulated between multiple positions (e.g., control 120 has four possible switch positions in addition to a neutral position) and other control inputs may be manipulated between on and off positions (e.g., control input 180 may be manipulated to an on position by pressing a button). In operation, therefore, interface 100 generally enables the pilot to access the various cockpit functions and fly the aircraft. Interface 100 is ergonomically designed to facilitate the accessibility and manipulation of each control, thus enabling a pilot to maintain continual view of the horizon and a Heads Up Display (HUD). Such a feature may improve the pilot's situational awareness, the pilot's ability to change control settings in turbulence and high acceleration maneuvers, and improve the pilot's reaction time.

As shown in FIG. 1C, the base 195 of interface 100 includes a plurality of conduits through which wires may extend. Signals may propagate along the wires to communicate pilot manipulation of interface 100 to avionics equipment capable of interpreting the signals and controlling the aircraft accordingly, as described further below with reference to FIG. 2. Adding additional Hands On Throttle And Stick (HOTAS) controls with multiple-position switches may enable pilots to make better use of advances in avionics. One way to add additional HOTAS switches or interfaces is to add additional wires to the aircraft through the control sticks and throttle fixtures. Adding additional wires, however, typically increases costs associated with development and implementation. For example, HOTAS systems in military aircraft normally have little room for additional wires and are commonly expensive items to modify. In addition, the circuitry that interfaces with the additional wires typically uses additional connector interfaces to control boxes.

Accordingly, some embodiments of the disclosure implement additional control inputs on to stick grips and throttle handles (e.g., interface 100) without additional wire paths into and through control sticks and throttle quadrants. Some such embodiments may use existing connector interfaces to control boxes for backward compatibility. For example, the illustrated HOTAS interface 100 may be designed to mate with the physical and electrical interfaces of existing B-8 grips currently used by various military aircraft models, through such B-8 HOTAS interfaces conventionally only have five buttons/switches as compared to the eight control inputs 110-180 of the illustrated example. One such example implementation that does not increase the number of wire paths into and through interface 100 over that used by B-8 HOTAS interfaces is described further below with reference to FIG. 2.

FIG. 2 is a schematic for an electrical circuit 200 that forms a portion of the control system of FIGS. 1A through 1C according to one embodiment. As shown in FIG. 2, a respective portion of circuit 200 couples the switch terminals of each control input 110-180 to at least two respective pin interfaces of avionics equipment 202. In this example, avionics equipment 202 generally includes a seventeen-pin electrical interface, a detector that is generally capable of determining an actual voltage drop associated with a particular manipulation(s) of control inputs 110-180, and a controller that is capable of generating control signals, based on the determination, that effect a control operation for the aircraft.

In various embodiments, avionics equipment 202 may be backwards compatible with existing control systems, such as the seventeen-pin interface of the B-8 military aircraft control system. In addition, the interfacing avionics equipment 202 may also function as the Multi-Function Color Display (MFCD). In operation, circuit 200 generally generates electrical signals that enable avionics equipment 202 to precisely determine the various manipulations of control inputs 110-180 by a pilot.

In this example, control input 120 is a four-way thumb switch with four wires attached to respective position contacts (e.g., up, down, left, and right) and a fifth wire for the common terminal of the switch. Moving the switch to any of the four positions causes the common terminal to establish electrical continuity with the appropriate terminal corresponding to the selected position. In this manner, the five wires connected to the switch terminals of control input 120 route electrical signals to the appropriate pin interfaces A, E, B, C, and P of avionics equipment 202, which interfaces with the wires and determines changes in the electrical continuity of the circuit caused by pilot manipulation of control input 120. In some embodiments, the five-wire configuration of control input 120 may provide enhanced reliability and sensitivity to pilot manipulation, and thus may be suitable in some applications for critical flight control functionality, such as aircraft trim. In some embodiments, however, it may be cost prohibitive to wire each multi-contact switch with five wires. Moreover, doing so may further complicate backwards compatibility with existing electronic interfaces.

As shown in FIG. 2, some of the control inputs 140, 150, and 160 use only two wires to service a four-way switch. More specifically, circuit 200 electrically couples the four-way switch terminals of control inputs 140, 150, and 160 to respective pin interfaces R, G, K, D and M of avionics equipment 202 using only two wires per control input 140, 150 and 160. Resistors 205-265 are incorporated into the design such that the various positions of each switch insert a specific resistance into circuit 200.

Resistance values of resistors 205-265 may be selected such that sensing circuitry of avionics equipment 202 can reliably distinguish the resulting voltages established in circuit 200 when electrical contact is made by activating the switch. For example, resistors 205, 210, 215, and 220 coupled to the switch terminals of control input 150 may have resistance values of 1.43 kiloohms, 8.45 kiloohms, 4.12 kiloohms, and 16.5 kiloohms, respectively. Similarly, resistors 225, 230, 235, 240 coupled to the switch terminals of control input 140 may have resistance values of 8.45 kiloohms, 4.12 kiloohms, 16.5 kiloohms, and 1.43 kiloohms, respectively; the resistors 245, 250, 255, 260, coupled to the switch terminals of control input 160 may have the values of 1.43 kiloohms, 8.45 kiloohms, 4.12 kiloohms, and 16.5 kiloohms, respectively; and resistor 265 coupled to a switch terminal of control input 130 may have the value of 38.3 kiloohms. The above resistance values are for example purposes only and any of a variety of alternative resistance values may be used. In addition, the various multi-contact control inputs 140, 150, and 160 need not necessarily use resistors 205-260 having the same or similar resistance values, though designing circuit 200 in this manner may reduce costs and simplify design. In this example, resistors 205-265 are integrated within interface 100; however, in various alternative embodiments resistors 205-265 may not be integrated within interface 100, though some such embodiments may have additional wires extending into and through interface 100.

By designing circuit 200 such that the common terminal of each control input is connected to electrical ground, two wires may be used to service multiple positions. If multiple control inputs share the same common ground (e.g., control inputs 130, 140, 150, and 160 share the same common ground), "N" number of control inputs may be efficiently serviced with just "N+1" wires. Further, two switches that are impossible or even just unlikely to be operated by the pilot at the same time can share the non-common wire between them.

Thus, as shown in FIG. 2, circuit 200 may be designed to service a control system of eight control inputs 110-180 using the same number of wires extending into and through control interface 100 as previous designs that serviced fewer control inputs. This feature not only reduces costs and design complexity, but may enable backwards compatibility with existing connector interfaces to control boxes.

Although the present disclosure has been explained in the context of an aircraft HOTAS system, the teachings of the present disclosure also apply to any of a variety of alternative human interfaces to electronics. For example, the teachings of the present disclosure may also apply to the steering wheels of modern automobiles (e.g., those used in Formula One and the Indy Racing League, luxury sports cars, etc.). In addition, the teachings may also be adapted for game controllers (e.g., controllers used for flight simulators, other multi-input game controllers, etc.).

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A hands on throttle-and-stick (HOTAS) for an aircraft, comprising:
at least eight switches, at least three of the at least eight switches each comprising:
a center terminal;
at least four switch positions that each electrically connect a respective position terminal to the center terminal, each position terminal electrically connected in parallel to a first electrical connector, each position terminal coupled to the first electrical connector through a respective resistor module, each resistor module having a total resistance value that is different from a total resistance value of each other resistor module; and wherein each of the center terminals of the at least three switches are electrically connected in parallel to a second electrical connector.

2. The HOTAS of claim 1, further comprising a control box coupled to each of the first electrical connectors and the second electrical connector, the control box comprising:

a detector capable of determining whether an actual voltage level associated with the four switch positions of each of the at least three switch switches is within a predetermined range; and a controller capable of effecting a control operation for the aircraft based on the determination.

3. The HOTAS of claim 2, wherein the control operation for the aircraft is selected from the group consisting of:
aircraft trim;
weapons select;
weapons release; and
target management.

4. The HOTAS of claim 1, wherein at least one of the at least eight switches comprises:

a first terminal electrically connected through a resistor module to the first electrical connector of one of the at least three switches, the resistor module of the at least one of the at least eight switches having a total resistance value that is different from the total resistance value of each resistor module of the at least three switches; and a second terminal electrically connected to the second electrical connector.

5. The HOTAS of claim 1, wherein the first and second electrical connectors are conductive wires.

6. The HOTAS of claim 1, wherein the first and second electrical connectors are coupled to a control box through respective pin interfaces of a bank of at least seventeen pin interfaces.

7. The HOTAS of claim 1, wherein each of the at least eight switches are electrically coupled to a control box through bank of pin interfaces; and wherein a total number pin interfaces of the bank of pin interfaces is no more than one greater than a total number of switches of the at least eight switches.

8. A method for controlling an aircraft by a hands on throttle-and-stick (HOTAS) that reduces the number of required electrical connections, comprising:

selectively connecting, by the HOTAS, two interfaces of a controller for the aircraft, the selective connection being made through one of a plurality of possible paths, each path having an expected respective voltage drop within a predetermined range;

determining the selected one of the possible paths connecting the two interfaces by determining an actual voltage drop associated with the selected path;

effecting a control operation for the aircraft, by the controller, based on the determined selected path; and electrically connecting a plurality of switches of the HOTAS to the controller through a plurality of interfaces, a total number of the plurality of interfaces no more than one greater than a total number of the plurality of switches.

9. The method of claim 8, wherein the plurality of switches are four-way switches.

10. The method of claim 8, wherein the predetermined range of the expected respective voltage drop of each path is mutually exclusive from each other path.

11. The method of claim 8, wherein the selectively connecting further comprises manipulating a four-way switch.

12. The method of claim 8, wherein the selectively connecting further comprises manipulating a two-way switch.

13. The method of claim 8, further comprising coupling at least eight switches to the HOTAS; and wherein the selectively connecting further comprises manipulating at least one of the at least eight switches.

14. The method of claim 8, wherein the effected control operation is selected from a list consisting of:
aircraft trim;
weapons select;
weapons release; and
target management.

15. An aircraft control system comprising:
avionics equipment comprising a detector and a controller;
a hands on throttle-and-stick (HOTAS) capable of selectively connecting two interfaces of the controller, the selective connection being made through one of a plurality of possible paths each path having an expected respective voltage drop within a predetermined range;

wherein the detector is capable of determining the selected one of the possible paths connecting the two interfaces by determining an actual voltage drop associated with the selected path; and wherein the controller is capable of generating a signal, based on the selected path determined by the detector, that controls an operation for the aircraft; and wherein a plurality of switches of the HOTAS are communicatively coupled to the avionics equipment through a plurality of interfaces, a total number of the plurality of interfaces no more than one greater than a total number of the plurality of switches.

16. The aircraft control system of claim 15, wherein the plurality of switches are each four-way switches.

17. The aircraft control system of claim 15, wherein the predetermined range of the expected respective voltage drop of each path is mutually exclusive from each other path.

18. The aircraft control system of claim 15, wherein the operation of the aircraft is selected from a list consisting of:
aircraft trim;
weapons select;
weapons release; and
target management.

* * * * *

UNITED STATES PATENT AND TRADEMARK OFFICE
CERTIFICATE OF CORRECTION

| | | |
|---|---|---|
| PATENT NO. | : 8,090,481 B2 | Page 1 of 1 |
| APPLICATION NO. | : 12/034520 | |
| DATED | : January 3, 2012 | |
| INVENTOR(S) | : Roy P. Mcmahon et al. | |

It is certified that error appears in the above-identified patent and that said Letters Patent is hereby corrected as shown below:

In column 5, line 12, in Claim 2, before "switches" delete "switch".

In column 6, line 30, in Claim 15, delete "paths" and insert -- paths, --, therefor.

Signed and Sealed this
Seventeenth Day of April, 2012

David J. Kappos
*Director of the United States Patent and Trademark Office*